March 30, 1948.  E. C. WALKER  2,438,589
ELECTRIC STRAIN GAGE
Filed Aug. 30, 1946

Inventor
Elwood C. Walker
By Godfrey B. Spero
Attorney

Patented Mar. 30, 1948

2,438,589

UNITED STATES PATENT OFFICE 2,438,589

ELECTRIC STRAIN GAGE

Elwood C. Walker, Caldwell, N. J., assignor to Curtiss-Wright Corporation, a corporation of Delaware Application August 30, 1946, Serial No. 693,899

8 Claims. (Cl. 201—63)

This invention relates to improvements in stress gages of the type which consist of a fine resistance wire filament bonded to an insulating sheet, of paper or the like, the gage assembly being adapted for bonding to the surface of an article whose stress is to be measured. As the article is stressed, the deformation of the article causes similar deformation in the sheet and resistance filament, altering the electrical resistance. The change in resistance becomes proportional to the stress imposed upon the article.

The invention further relates to improvements in the type of gage disclosed in the copending application of Sidney B. Williams, Serial No. 532,010, filed April 19, 1944, and entitled "Strain responsive gage." In said application is taught the principle of utilizing special arrangements of resistance wire gages whereby stress may be measured directly. Prior to the Williams teaching, strain gages were used to determine stress in an article, such prior techniques requiring extensive mathematical computation to determine stress values from measurements of those resistance changes in strain gages which are proportional to strain alone.

In many types of stressed bodies, particularly the blades of hollow steel propeller blades, stresses may exist simultaneously in different directions. In analyzing the stresses in such bodies, the directions of action of the coexisting stresses is established by the use of rosette strain gages or other means. After once establishing the direction of action of major stresses, repeated tests of the same character become arduous when rosettes or strain gages are used by virtue of the extensive computation needed for determining stress. Accordingly, it is most convenient in repetitive tests to use gages whose output is stress-proportional with the gage axes oriented along the known direction of greatest stress. This stress gage avoids the arduous calculations necessary when orthogonally disposed strain gages are used. Without the stress gage, two strain gages are necessary to measure the biaxial strains and to evaluate the major stress.

As taught in said prior application, the stress gage is composed of strain gage elements specially arranged and interconnected whereby strains on orthogonal axes are measured simultaneously, the gage wire lengths being so chosen as to embrace the effect of Poisson's ratio of the material being tested. The gage output, that is, the changes in gage resistance with the application of stress, becomes proportional to stress along the gage axis and take into account Poisson's ratio, strain along the gage axis and strain normal to the gage axis.

Objects of the present invention are: to provide a stress gage having a high degree of sensitivity to stress changes with concurrent relatively large changes in resistance to enable facile and precise determination of stress variations and magnitudes; to provide a stress gage of the resistance wire type whose changes in resistance will be proportional to the stress imposed on a body to which the gage is secured; to provide a stress gage having indicia thereon to enable precise location of the stress responsive axis of the gage in that direction on a body known to be the direction along which a stress is to be measured; to provide a high resistance gage having a multiplicity of runs or limbs of resistance filament, all oriented on the gage to provide for direct stress measurement. Other objects of the invention are accomplished by the arrangements set forth in the following detailed description when read with the accompanying drawings. It is to be understood however, that the drawings and description are employed for illustration only and do not define the limits of the invention; for this purpose reference should be made to the appended claims.

Figure 1:
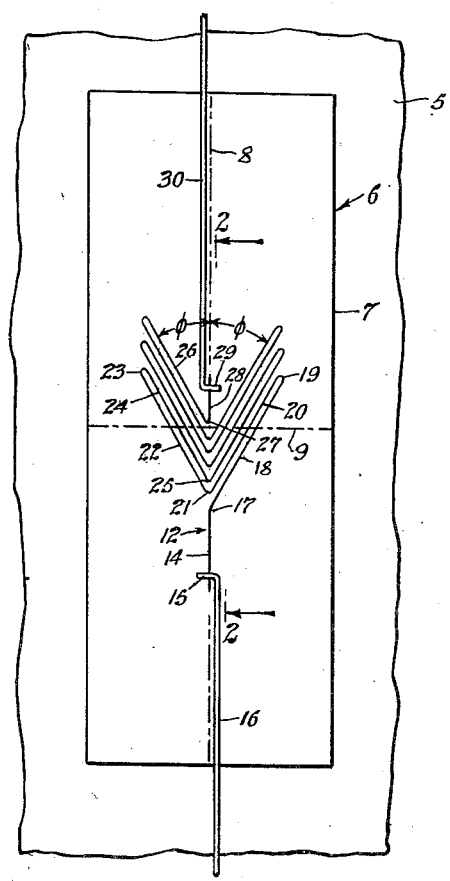
Fig. 1 is a plan of one embodiment of the invention.
Figure 2:
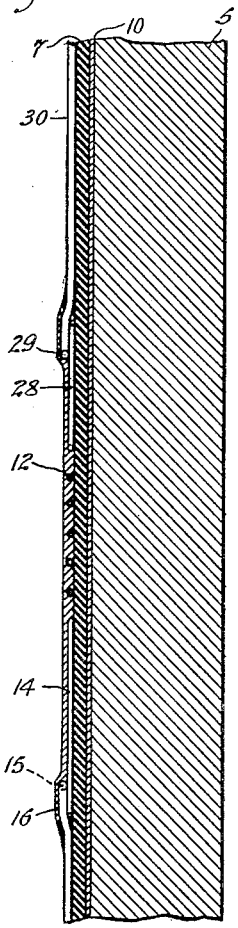
Fig. 2 is an enlarged section on the line 2—2 of Fig. 1.

Referring to Figs. 1 and 2, 5 represents a body of material such as a plate or mass of metal or other material subject to stress and whose stress is to be measured. The body 5 is presumed to be stressed in more than one direction, as by flexural, tensile, compressive, or other kind of stress. While actual stress may be measured by a gage 6 in any direction along the face of the body 5, it is assumed for purpose of illustration that it is desired to measure a major stress value, and that it is known that major stress occurs along an axis which is vertical, or lengthwise of the drawing, in the arrangement shown. In order that the gage 6 may be properly installed on the body 5, the gage comprises a base sheet 7 of insulating flexible material such as paper, said sheet 7 having the major or longitudinal axis 8 (the gage axis) and a minor or transverse axis 9 inscribed thereon as by printing. If desired, the gage axis may be established by the edge of the sheet 7, by the form of the sheet 7 or other means, including merely the pattern of the resistance filament or lead wires. Accordingly, as shown, the gage axis 8 is oriented vertically and in parallelism with the axis of major stress or the axis along which the stress is to be measured. The sheet 7 carrying other portions of the gage presently to be described, is bonded to the surface of the body 5 by a layer of adhesive bonding material 10.

The gage sheet 7, carrying the previously installed gage elements to be described, is a unit which may be readily handled and applied to the surface of any body whose stress is to be measured.

The active part of the gage consists of any suitable fine resistance wire or filament 12. Merely as an example, gages which have been used extensively in stress measurement on propeller blades, have had wire about .001" in diameter and a fairly high specific resistance. It may be in fact, the same type of wire utilized in known types of strain gages, and is bonded to the sheet 7 throughout its length by means already known in the art.

The crux of the invention lies in the arrangement of the filament on the sheet 7 in any embodiment of the gage. In Fig. 1, for example, one end of the filament as at 14 lies substantially along the gage axis 8 and is electrically connected to the bent over end 15 of a wire conductor 16 which is cemented to the sheet 7. The conductor 15 and others like it may be of foil or flattened wire to increase bonding area and ruggedness of the gage and to decrease the thickness of the gage. The filament end 14 extends along the gage axis to a point 17 whence it extends in a limb 18 making an acute angle $\phi$ with the gage axis 8. The limb 18 extends outwardly to a point 19 where the filament turns back upon itself and lies in a limb 20 parallel to and spaced from the limb 18, the limb 20 extending to a point 21 on the gage axis 8. There, the filament crosses the gage axis and extends outwardly therefrom in a limb 22 to a point 23, the limb 22 lying on a line which makes the angle $\phi$ with the gage axis on the opposite side thereof from the limbs 18 and 20. From the point 23, the filament extends back in a limb 24 parallel to and spaced from the limb 22, to a point 25 on the gage axis. The limbs 18, 20, 22 and 24 are preferably, though not necessarily, of the same length. Symmetry of filament length on each side of the gage axis is desirable to maintain gage accuracy, particularly if biaxial stresses in the body 5 are not normal to one another. From the point 25, additional limbs are formed from the filament, such limbs or runs consecutively lying parallel to the limbs 18, 20, 22 and 24 until a sufficient number of limbs has been built up on each side of the gage axis to provide a total wire length whose resistance is great enough to be compatible with the instrumentation utilized for measurement of gage resistance. The last limb of the gage 26, corresponding in its orientation to the limb 24, meets the gage axis at a point 27 whence the filament lies along the gage axis 8 as at 28 to connect with the bent over end 29 of a conductor 30 which lies substantially along the axis 8 and is bonded to the sheet 7.

One of the objectives in utilizing a plurality of limbs of resistance wire, is to secure a fairly large resistance change in the wire with small changes in stress. Also, the configuration of the several filament limbs is such that a large amount of wire may be concentrated in a relatively small area on the surface of the test body so that the gage will indicate the stress in a small and localized area on the body. The gage may cover any desired area but for most purposes as small a gage as possible is desirable. The physical characteristics of gages presently used, which are not cited as limiting, include a nominal resistance of about 500 ohms, and an active gage area of approximately ½" across the gage axis and ¾" along the gage axis. The need for units which are physically smaller than the above has been insufficient up to this time to warrant their construction. However, when the use of gages of this type becomes more widespread, smaller units can be constructed.

The angle $\phi$ mentioned above is a function of Poisson's ratio of the material to which the gage is to be applied. Preferably, the angle $\phi$ is that angle whose tangent squared is equal to Poisson's ratio.

Figure 3:
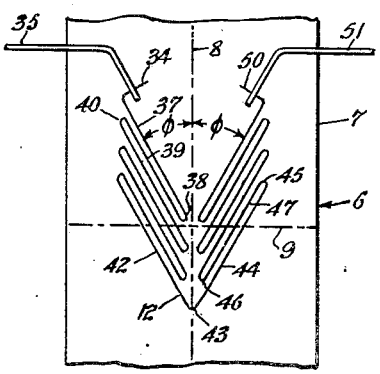
Fig. 3 is a plan of an alternate embodiment of the invention.

In Fig. 3 an alternative gage arrangement is shown which is suggestive of various alternative arrangements to secure substantially the same functional result as that obtained by the embodiment of Fig. 1 although disposition of the elements is different. In Fig. 3, the filament 12, which is bonded to the sheet 7 throughout its length, starts at a point 34 in the upper left quadrant defined between the axes 8 and 9. Here the wire is secured to a conductor 35, likewise bonded to the sheet 7 and from the bond it turns toward the intersection of the axes 8 and 9 and extends in a limb 37 which makes the angle $\phi$ with the gage axis to a point 38 lying a small distance away from the axis 8. There, the filament turns back upon itself and forms a second limb 39 spaced from and parallel to the limb 37, the limb 39 extending to a point 40 so that the length of limbs 37 and 39 is substantially the same if desired. A succession of limbs similar to 37 and 39 then are formed, all on the left side of the axis 8, until the last limb 42 of this series extends to a point 43 on the gage axis 8. Thereupon, the filament crosses the gage axis and forms a limb 44 extending to a point 45, the limb 44 making the angle $\phi$ with the gage axis on the opposite side of said axis from the previously described filament limbs. From the point 45 the filament extends inwardly toward the gage axis to a point 46, forming a limb 47 parallel to and spaced from the limb 44. From the point 46, a similar succession of limbs are formed parallel to the limb 44, terminating in the filament end 50 lying opposite the filament end adjacent the point 34 across the gage axis 8. The filament end 50 is connected to a gage conductor 51 which, like the conductor 35 is bonded to the gage sheet 7. Preferably, the number of limbs on each side of the gage axis is the same, and preferably all of the limbs should be of the same length although this is not essential. As in the embodiment of Fig. 1, the tangent squared of the angle $\phi$ is substantially equal to Poisson's ratio of the material with which the gage is to be used. The filament ends adjacent the end limbs of the active part of the gage, where they are connected to the conductors or lead wires such as 35 and 51, are preferably perpendicular to the associated gage limbs. These relatively short ends are thereby relatively unstrained during gage operation and will inject minimum error into the gage reading. Also, since they are unstrained, there will be little or no tendency for disruption of their connection with the conductors or lead wires.

The particular form of the gage and the pattern of the filament is capable of many variations without departing from the scope of the invention. For particular purposes, it may be desirable to change the length and spacing of the filament limbs, and the points on the gage where the conductors or lead wires are connected to the filament. For instance, the lead wires of Fig. 1 are connected at opposite ends of the gage while in Fig. 3, they are both connected and secured at one end. It may be desirable to connect the lead wires at the sides or bottom of the gage or otherwise, to make connection of the gage to its associated instrumentation as direct and simple as possible.

Though but two embodiments of the invention have been illustrated and described, it is to be understood that the invention may be constructed or applied in other forms. Various changes may be made in the arrangements of the resistance filament and other gage components without departing from the spirit of the invention as will be apparent to those skilled in the art, and reference should be made to the appended claims for a definition of the limits of the invention.

I claim:

1. In a stress gage, an insulating sheet adapted to be bonded to a body whose stress is to be measured along a certain axis, a gage axis index associated with said sheet to assist in orienting the gage axis relative to said certain axis, a continuous resistance filament bonded to said sheet, extending back and forth along said sheet in a plurality of substantially straight runs parallel to one another, said runs being disposed at an acute angle to said gage axis, said angle being a function of Poisson's ratio of the material upon which the gage is adapted to be bonded, and conductors forming gage terminals connected to the ends of said filament.

2. In a stress gage, an insulating sheet adapted to be bonded to a body whose stress is to be measured along a certain axis, a gage axis index associated with said sheet to enable orientation of the gage axis along said certain axis, a continuous resistance filament bonded to said sheet extending back and forth along said sheet in two pluralities of runs the runs in each plurality being parallel to one another, one said plurality of runs forming an acute angle with said gage axis on one side thereof and the other plurality forming an equal acute angle with said gage axis on the other side thereof, the included angle between said pluralities being a certain function of Poisson's ratio of the material upon which the gage is adapted to be bonded, and conductors forming gage terminals connected to the ends of said filament.

3. In a stress gage, an insulating sheet adapted to be bonded to a body whose stress is to be measured along a certain axis, a gage axis index associated with said sheet to enable orientation of the gage axis along said certain axis, a conductor secured to said sheet, a resistance wire filament connected to the conductor and bonded to the sheet, said wire extending in a first straight run from said connection at an acute angle to the gage axis, then turning back in a second straight run parallel to and spaced from the first run, then turning in a third straight run at an acute angle to the gage axis but on the opposite side of the axis from the first runs, then turning back in a fourth straight run parallel to and spaced from the third run, said wire then lying as desired in a succession of additional runs sequentially following the pattern of the said four runs, and a second conductor secured to said sheet connected to the final end of said wire.

4. In a stress gage, an insulating sheet adapted to be bonded to a body whose stress is to be measured along a certain axis, a gage axis index associated with said sheet to enable orientation of the gage axis along said certain axis, a conductor secured to said sheet, a resistance wire filament connected to the conductor and bonded to the sheet, said wire extending in a first straight run from said connection at an acute angle to the gage axis, then turning back in a second straight run parallel to and spaced from the first run, then turning in a third straight run at an acute angle to the gage axis but on the opposite side of the axis from the first runs, then turning back in a fourth straight run parallel to and spaced from the third run, said wire then lying as desired in a succession of additional runs sequentially following the pattern of the said four runs, and a second conductor secured to said sheet connected to the final end of said wire, the included angle between the first and third wire runs being a function of Poisson's ratio of the material to which the gage is adapted to be bonded.

5. In a stress gage, an insulating sheet adapted to be bonded to a body whose stress is to be measured along a certain axis, a gage axis index associated with said sheet to enable orientation of the gage axis along said certain axis, a conductor secured to said sheet, a resistance wire filament connected to said conductor and bonded to the sheet, said wire extending in a first straight run from said connection at an acute angle to the gage axis, then turning back and forth in a succession of runs parallel to the first, said wire, from the final run of said succession, crossing the gage axis and extending in an $n$th straight run from said crossing at an acute angle to said gage axis but on the opposite side thereof from the said succession of runs, said wire then turning back and forth in a second succession of runs parallel to the $n$th run, and a second conductor secured to said sheet and connected to the final end of said wire.

6. In a stress gage, an insulating sheet adapted to be bonded to a body whose stress is to be measured along a certain axis, a gage axis index associated with said sheet to enable orientation of the gage axis along said certain axis, a conductor secured to said sheet, a resistance wire filament connected to said conductor and bonded to the sheet, said wire extending in a first straight run from said connection at an acute angle to the gage axis, then turning back and forth in a succession of runs parallel to the first, said wire, from the final run of said succession, crossing the gage axis and extending in an $n$th straight run from said crossing at an acute angle to said gage axis but on the opposite side thereof from the said succession of runs, said wire then turning back and forth in a second succession of runs parallel to the $n$th run, and a second conductor secured to said sheet and connected to the final end of said wire, the included angle between the two successions of wire runs being a function of Poisson's ratio of the material to which the gage is adapted to be bonded.

7. In a stress gage for determining stress in an article, a grid of resistance wire bonded in insulated relation to the surface of the article, said grid comprising a plurality of spaced parallel limbs serially connected, and conductors connected to the wire ends, the limbs of said grid making an angle with the axis along which article stress is to be measured, the tangent of said angle, squared, being substantially equal to Poisson's ratio of the material of the article.

8. In a stress gage for determining stress in an article, a grid of resistance wire bonded in insulated relation to the surface of the article, said grid comprising a plurality of spaced parallel limbs serially connected, and conductors connected to the wire ends, the limbs of said grid making an angle with the axis along which article stress is to be measured, the tangent of said angle, squared, being substantially equal to Poisson's ratio of the material of the article, the wire ends, at their juncture with said conductors, respectively being substantially normal to the direction of the associated limbs.

ELWOOD C. WALKER.